US005568941A

United States Patent [19]
Woydick et al.

[11] Patent Number: 5,568,941
[45] Date of Patent: Oct. 29, 1996

[54] SEAT BELT RETRACTOR AND IMPROVED SENSING MECHANISM

[75] Inventors: Mark C. Woydick, Romeo; William L. Palmer, Rochester, both of Mich.

[73] Assignee: AlliedSignal Inc., Morristown, N.J.

[21] Appl. No.: 583,768

[22] Filed: Jan. 11, 1996

Related U.S. Application Data

[63] Continuation of Ser. No. 486,145, Jun. 7, 1995, abandoned, which is a continuation of Ser. No. 278,449, Jul. 21, 1994, abandoned.

[51] Int. Cl.⁶ .................................................. B60R 22/36
[52] U.S. Cl. ................................. 280/806; 242/384.6
[58] Field of Search ................................ 280/801, 805, 280/806, 807; 242/384.6

[56] References Cited

U.S. PATENT DOCUMENTS

| | | | |
|---|---|---|---|
| 3,770,224 | 11/1973 | Hayashi et al. | 242/384.6 |
| 4,991,874 | 2/1991 | Tsuge et al. | 280/806 |
| 5,039,127 | 8/1991 | Föhl | 280/806 |
| 5,076,610 | 12/1991 | Struck | 280/806 |
| 5,211,694 | 5/1993 | Sakakida et al. | 280/806 |

FOREIGN PATENT DOCUMENTS

| | | | |
|---|---|---|---|
| 3421945A1 | 12/1985 | Germany | B60R 22/36 |
| 2010071 | 6/1979 | United Kingdom | A62B 35/02 |
| 2073578 | 4/1980 | United Kingdom | A62B 35/02 |
| 2154853 | 9/1985 | United Kingdom | B60R 22/34 |
| WO95/06576A | 3/1995 | WIPO | B60R 22/405 |

Primary Examiner—Kenneth R. Rice
Attorney, Agent, or Firm—Markell Seitzman

[57] ABSTRACT

A vehicle inertia or deceleration sensing device of a seat belt retractor comprising: an outer housing member including a first housing part for supporting an inner housing member at a predetermined relative angle, and a support member for holding the first housing part at another angle, such angles corresponding to mounting angles of a frame of the retractor.

20 Claims, 7 Drawing Sheets

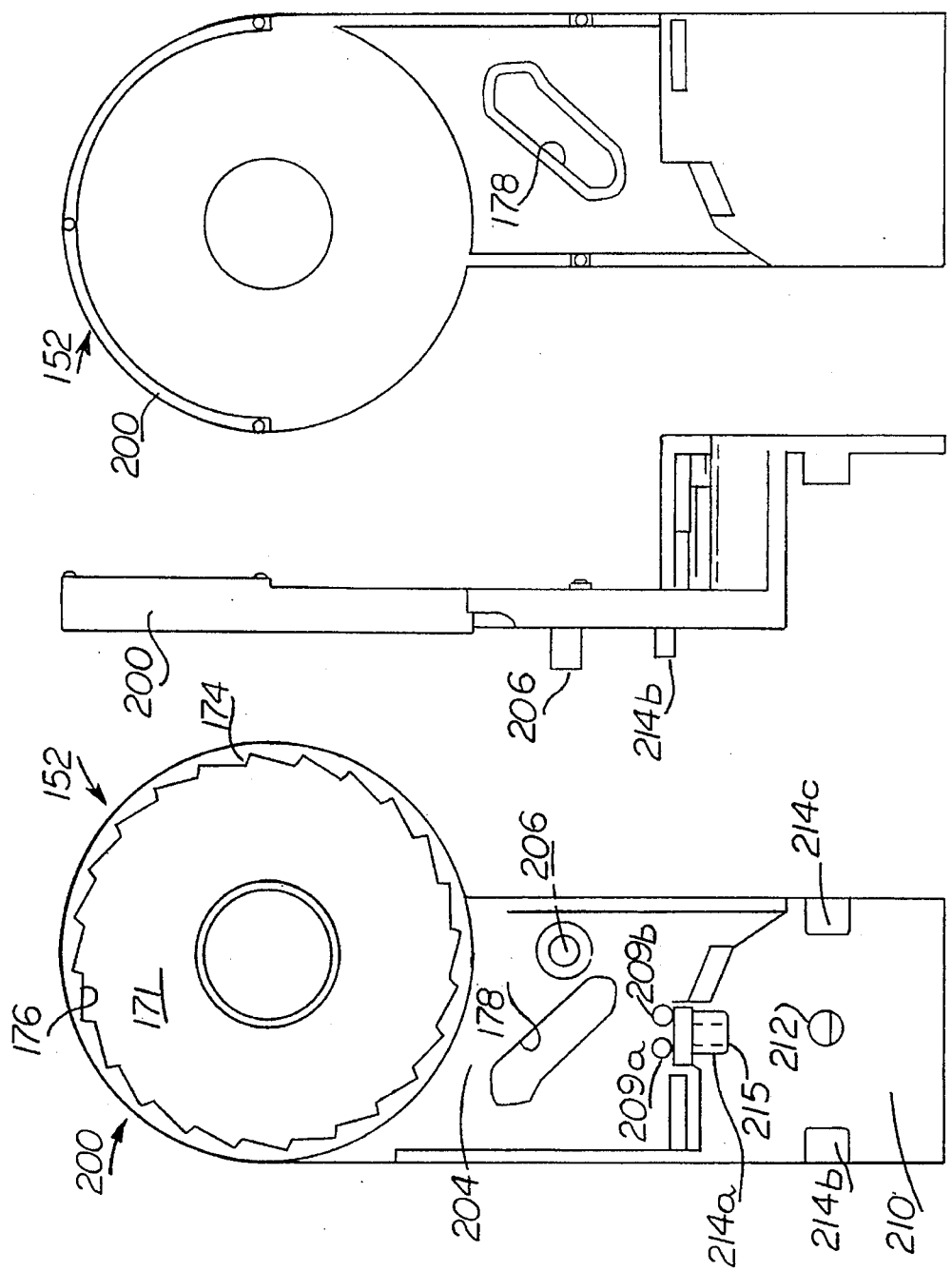

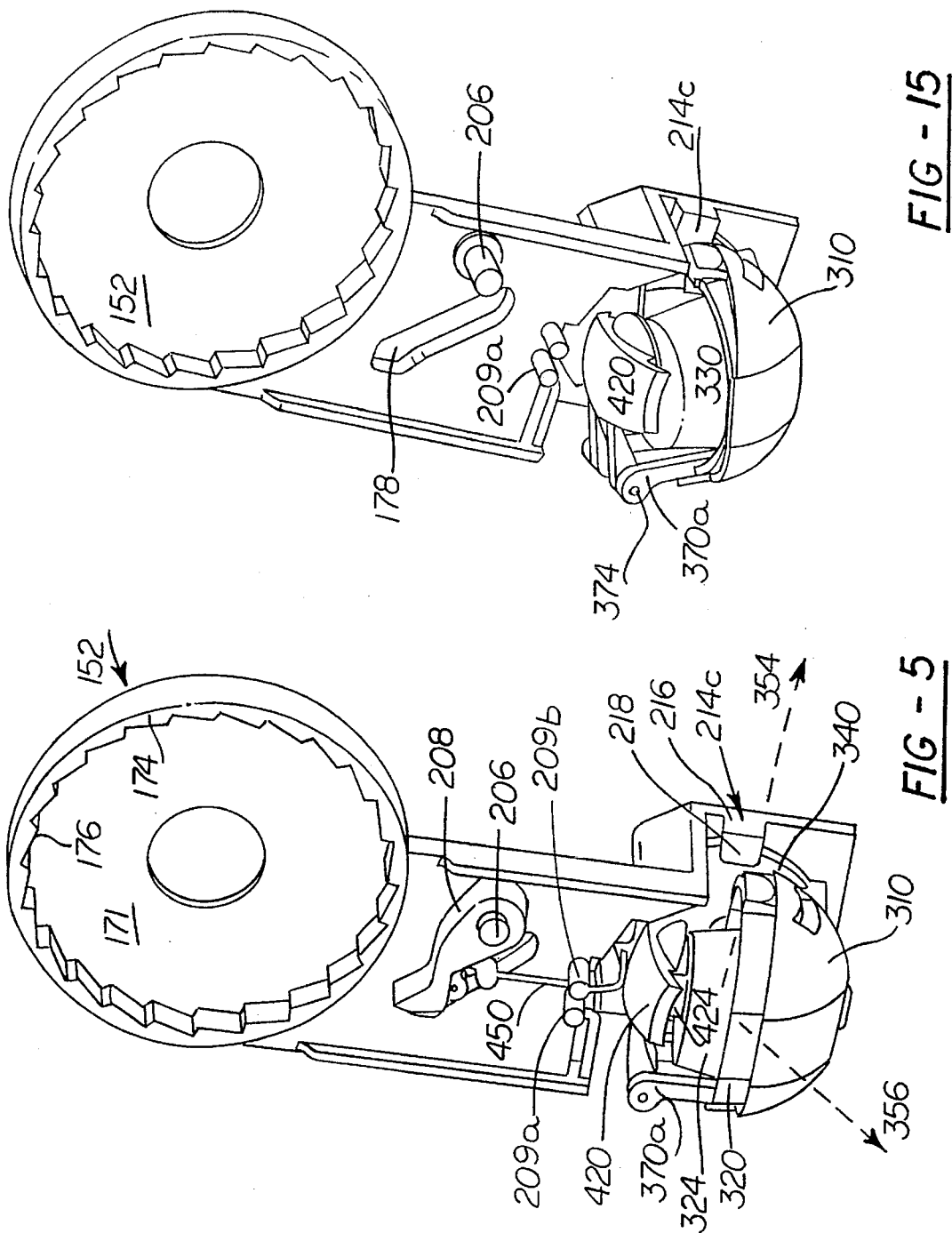

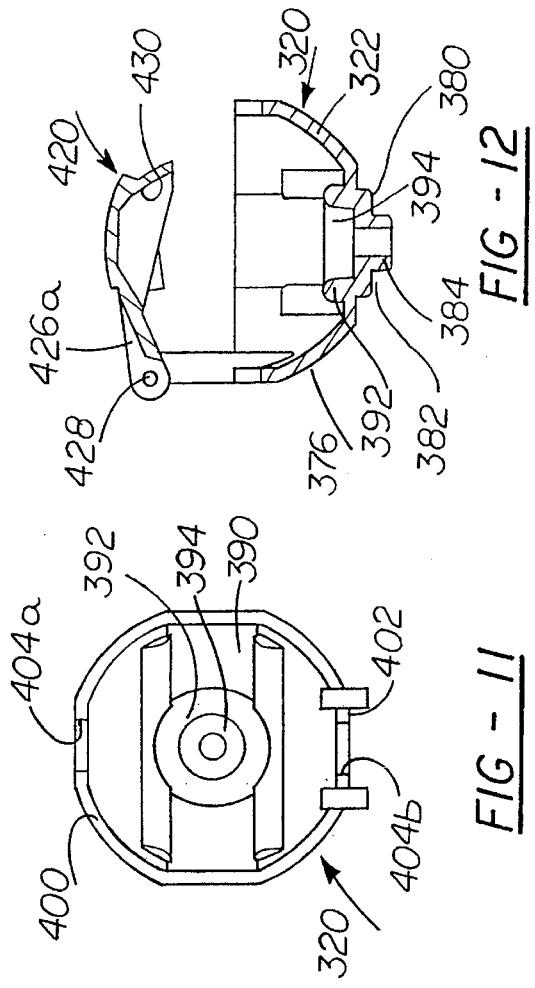
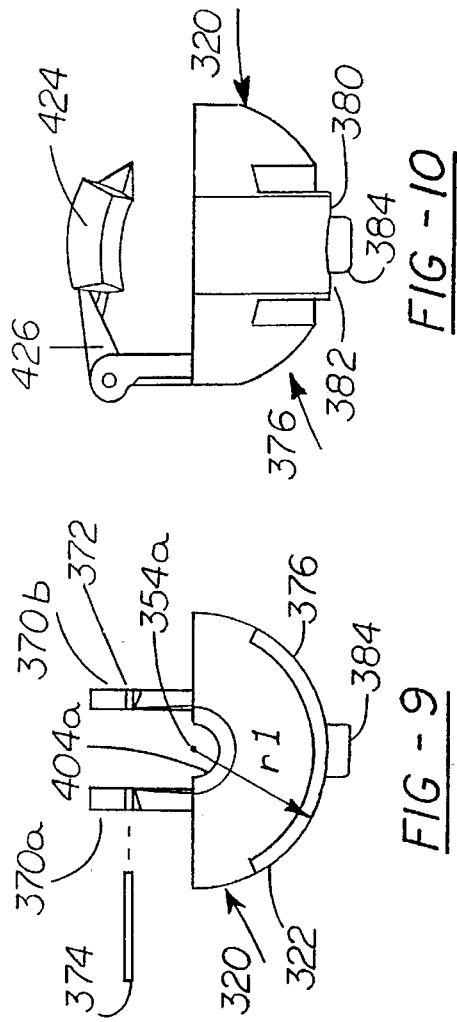
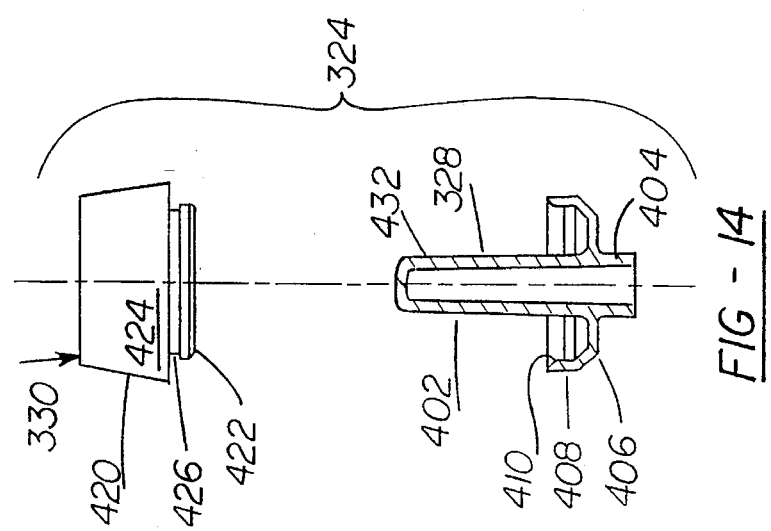

5,568,941

SEAT BELT RETRACTOR AND IMPROVED SENSING MECHANISM

This application is a continuation of application Ser. No. 08/486,145, filed Jun. 7, 1995, now abandoned which is a continuation of application Ser. No. 08/278,449 filed Jul. 21, 1994, now abandoned.

BACKGROUND AND SUMMARY OF INVENTION

The present invention generally relates to seat belt retraction mechanisms and more specifically to an improved vehicle deceleration responsive sensor. Such type of sensor is often called, in the art, vehicle or inertia sensors.

Seat belts and retractors are commonly used as part of a safety restraint system to protect vehicle occupants. A typical retractor includes a spool, a frame for supporting the spool, a locking mechanism(s) to stop the spool from rotating and web and/or vehicle sensors for initiating spool lockup upon sensing certain dynamic criteria.

A practical seat belt retractor should of course be of low cost and of high quality. The underlying design must be flexible to accommodate varying customer performance criteria. Such criteria will generally include, in addition to the above: small package size to permit the retractor to be easily fit into virtually any location and any orientation within a vehicle, and light weight construction. In addition, the retractor should be relatively easy to manufacture and have a design amenable to automated manufacturing techniques. The retractor should be characterized by low belt extraction and retraction forces and an overall quiet operation. The retractor should be capable of using one or more sensors such as a web sensor and vehicle sensor without a major change in the basic structure of the retractor and be smooth in its operation and not jam, as well as be capable of withstanding loading forces in the range of 18 KN. With regard to the vehicle sensor, such sensor should be flexible in its design to accommodate working with a retractor that is mounted in a tilted or skewed positioned.

It is the object of the present invention to provide an improved seat belt retractor having an improved vehicle sensor.

Accordingly, the invention comprises: a retractor including a vehicle inertia or deceleration sensing device for and including a seat belt retractor comprising: an outer housing member including a first or outer housing part for supporting an inner housing member at a predetermined relative angle. The first housing part includes first and second coordinate reference axes superimposed therein. The inner housing member comprises: a second or inner housing part which includes an outer surface, a portion of which has a diameter of r 1 measured from a geometric center of the second housing part and an inner surface. The second or inner housing member or part also includes at least one extending leg member having an end which defines a hinge axis. An activation portion is pivotally connected at the hinge axis and includes a spherically shaped, top surface having by a radius of r 1 and an under surface. Located in the inner member is an inertial member, responsive to changes in vehicle acceleration or deceleration and movable relative to the inner surface of the second housing part. The inertial member also supports the under surface of the activation portion, such that in a rest position, the spherical top surface of the activation portion is positioned on a sphere of radius r 1, centered at the center of the second housing part. The invention further includes first means for fixedly mounting the second housing part at a predetermined first angle about the first reference axis in the first housing part, such angular positioning not changing the height of the activation surface. A support member is provided for supporting the first housing part. The invention also includes second means for fixedly mounting the first housing part at a predetermined second angle, about the second reference axis relative to the support member, without changing the height of the activation portion, wherein in response to an acceleration or deceleration greater than a given magnitude the inertial mass moves relative to the inner surface, and moves the activation portion outwardly. Upon mounting the parts as described the inertialmember is maintained vertical.

Many other objects and purposes of the invention will be clear from the following detailed description of the drawings.

BRIEF DESCRIPTION OF THE DRAWINGS

In the drawings:

FIGS. 2–5 show various views of a vehicle sensor support plate.

FIGS. 9–12 show various views of an inner member of the vehicle sensor.

FIG. 14 shows a view of a standing man inertial member.

FIG. 15 is a projected view of an assembled support member, and vehicle sensor.

DETAILED DESCRIPTION OF THE DRAWINGS

Figure 1:
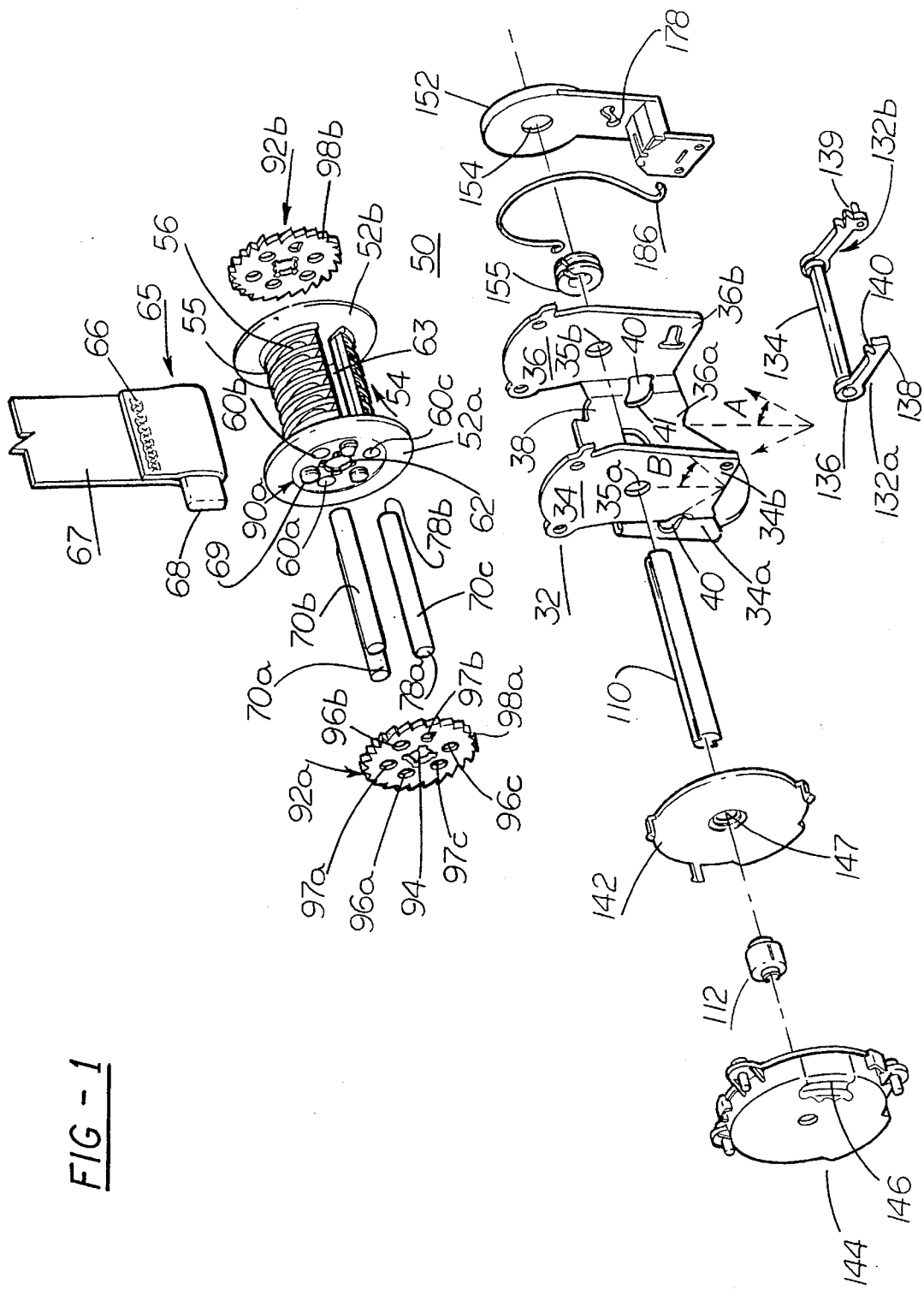
FIG. 1 is a assembly view showing many of the parts of the present invention.
Figure 1:
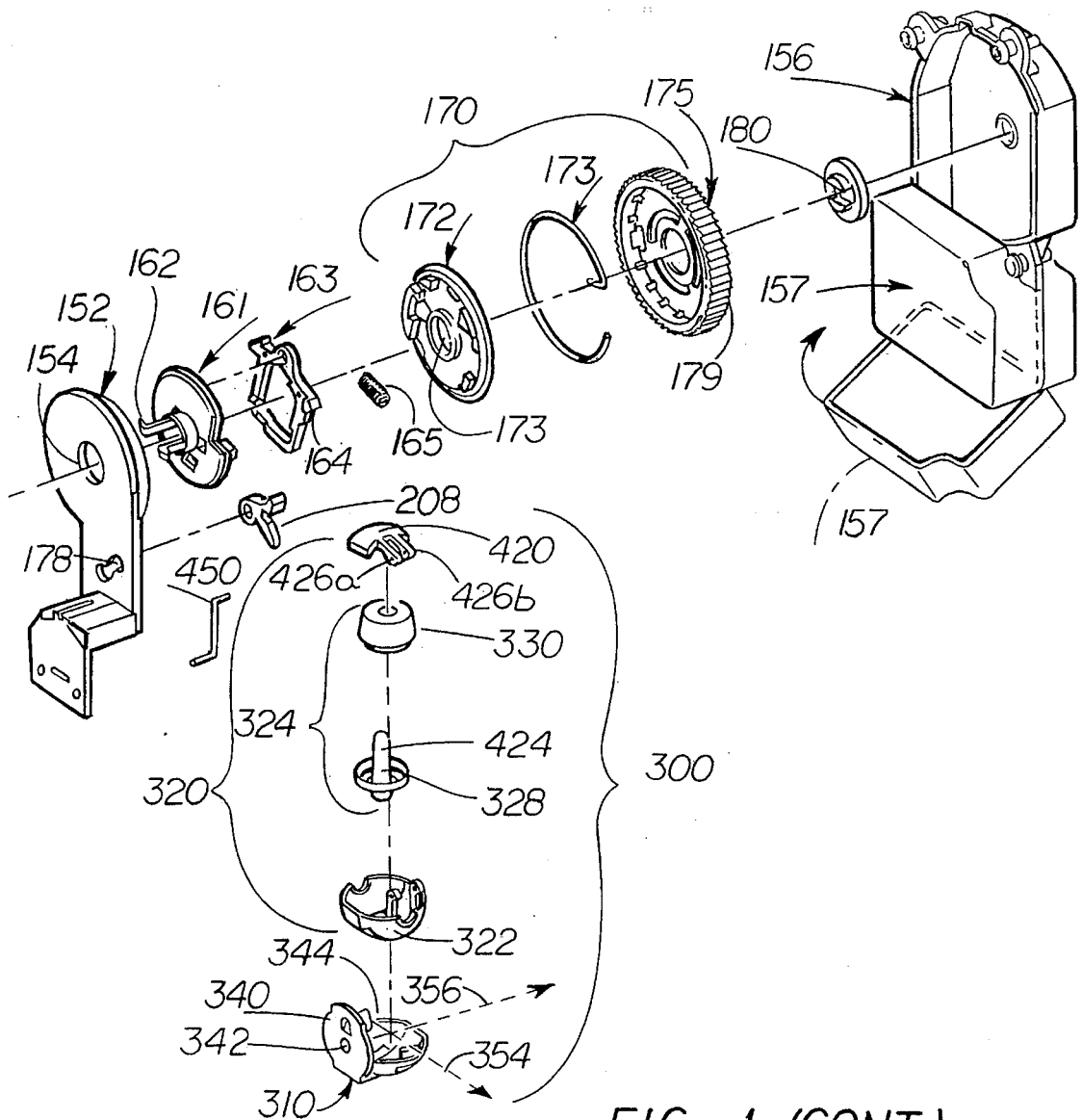

With reference to FIG. 1 there is shown a retractor 30 comprising a U-shaped frame generally shown as 32 having two parallel side o walls 34 and 36 which extend outwardly from a bottom 38. Each side wall has a step, or bend and defines a narrow inner wall portion 34a and 36a, a wider outer portion 34b and 36b joined by an outwardly extending shoulder 34c and 36c. Each side wall 34 and 36 includes a pocket or opening, such as 40 and 42. In the illustrated embodiment the pocket permits the installation and operation of a locking mechanism 130. The pocket 40 is somewhat oval shaped having wide opening portion and a narrow, circular, rear portion 41. As can be seen, pocket 40 is formed in side wall 34. The pocket or opening 42, positioned in side wall 36.

Rotatably positioned between the side walls 34 and 36 is a spool generally shown as 50 upon which webbing 67 is wound. The spool includes two oppositely positioned, integrally formed flanges 52a and 52b. As can be seen the spool 50 additionally includes a center body 54. The body 54 can be formed with a cylindrical body surface (constant radius) or a surface of varying radius such as a Archimedean spiral. A plurality of cut-outs or cores such as 56 are formed within the body 54 to reduce the overall weight of the spool and to reduce shrinkage if the spool is molded. By introducing the cut-outs or cores a plurality of ribs 55 are formed. The spool includes a central bore 62. The bore 62 extends through the end flanges 52a and 52b permitting a shaft 110 to extend therethrough. The shaft also extends through opening 35a and 35b in the frame. The center bore 62 and shaft 110 also define the rotationally centerline or axis of the spool 50. Fabricated within the body 54 of the spool are also a plurality of through bores 60a, b and c, the ends of which are shown. The spool body 54 additionally includes a slot 63 eccentricity or offset positioned relative to the center of bore 62. A looped end 65 of the seat belt webbing 67, is secured by stitches 66 about a web pin 68, is trapped in the slot in a known manner. The spool 50 additionally includes a plurality of locating features such as a plurality of positioning bosses 69 which extend from outer surfaces 90a and 90b of the flanges.

Positioned on the outer side surfaces 90a and 90b of the spool is a first and a second, preferably metal disk 92a and 92b. Disk 92a includes a centrally located shaped hole 94 and a first plurality of openings 96a, 96b, 96c and a second plurality of openings 97a, 97b, 97c. The shaft 110 extends through the shaped hole, opening or key way 94 and drives the disks. In the present embodiment of the invention the openings 96 and 97 are identical and evenly spaced about each disk. The first openings 96 are aligned to the placement of the bores 60 and receive reinforcement pins 72a–c which extend through the spool. Each of the pins is secured to a respective disk by any one of the known securement techniques, such as mechanical fastening, welding, metal forming, etc. The second openings are aligned relative to the placement of positioning bosses 69 to insure proper alignment of the disks 92 and the spool 50. Disk 92b is of relatively similar construction. Each disk, respectively includes a plurality of locking teeth 98a and 98b.

In the preferred embodiment of the invention, it is contemplated that the spool 50 will be fabricated of a lightweight, non structural plastic. As such, this plastic material is typically not capable of withstanding by itself, the large compressive belt loading generated during a crash. The spool 50 is physically supported by a skeleton or frame provided by the plurality of bars or pins 72 and the externally positioned disks 92a, 92b. It should be appreciated that the number of pins or bars used will at a minimum be two and preferably three or more. The preferred embodiment of the invention utilizes three such pins or bars 72a–72c. Further, the cross-sectional profile of each of the through bores 60a–60c is chosen to conform to the shape of the exterior profile of each pin. In addition, the pins 72 are closely spaced relative to its corresponding bores 60a–c and may be pressed or loosely fit through the bores 60a–c such that each pin is totally or substantially enveloped by the spool material. In this way, any forces generated during retractor operation and including those higher level forces generated, during a crash, when the spool is locked will be distributed across a relatively large internal areas of the through bores, that is, the area of the spool in contact with pins.

Reference is again made to FIG. 1 which also shows a locking mechanism 130. The mechanism 130 includes a plurality of pawls 132a and 132b linked together by a center shaft 134 permitting the pawls to move in unison. The lower end 136 of each pawl is circularly shaped such that it conforms to and fits within the circularly shaped end 41 of a corresponding pocket 40 and 42, formed on each lower frame side wall 34a and 36a. This locking mechanism and frame design facilitates the simple drop-in placement of the locking mechanism in the frame 32 while providing lateral containment of the locking mechanism 130 within the frame sides and does not require the frame to be separated during insertion as is found in some prior retractors. The other end 138 of each pawl 132a, b contains a locking formation 140 for engagement with at least one tooth 98a, b. In the preferred embodiment, this locking formation includes a double tooth counter profile for engagement with end faces of two of the teeth 98a, b. Extending from pawl 132a is a pin 139 which is used to move the locking mechanism into engagement with the disks 92a and 92b.

A spring assembly 140 is positioned on the left side of the frame 32. The spring assembly includes a plate 142, typically plastic, butted against frame side 34 and a cover 144, a return spring 146. The return spring 146 is positioned inside the cover 144. One end of the spring 146 is secured to the cover and the other is secured to a spring arbor 112 as is typical of the art. The spring arbor 112 can function as a bushing and receives the left end of the shaft 110. The shaft 110 also extends through an opening 147 in the plate 142 which can also provide a bushing surface to support the left side of the shaft 110. The return spring 146 provides the bias force to retract the webbing 67.

Positioned adjacent the right side wall 36 of the retractor is a second cover 156 having an articulated bottom part 157 which when closed covers the vehicle sensor 310, 320. A vehicle sensor support or plate 152 is loosely received about the shaft 110 and includes a cam slot 178 for receipt of the locking member pin 138. The support 152 operates as a cam, when activated by the vehicle or web sensor to move the pin 138 and then the locking member 140 into engagement with the toothed disks 92a and 92b. In alternate embodiments of the invention the support 152 may be locked to or formed as part of a retractor frame side and may or may not include the slot 178. The support 152 includes an opening 154 which provides a bushing for supporting the right side of shaft 110. A separate bushing or bearing 155 may also be provided.

Common with most emergency locking retractor is the use of a web sensor and a vehicle sensor which sense the speed at which webbing is protracted and vehicle deceleration and then activate a member to initiate locking of a spool. Rotationally coupled to the shaft 110 is one such web sensing mechanism generally shown as 160 when activated causes the spool to lock if the webbing 67 is protracted faster that a determinable speed. This type of web sensor includes a pawl plate 161 having tabs 162 which engage the center bore 62 of the spool 50 or engage the right hand end of the shaft 110 and which rotate with the shaft. Positioned on this pawl plate is a hinged locking pawl 163 having at least one locking tooth 164 which is moved into engagement with teeth on a cooperating part of the retractor. In the present case such teeth 174 are formed on an inner surface of the vehicle sensor support 152. The pawl 163 is biased by spring 165. In the illustrated embodiment this web sensor also includes a slip clutch 170 formed by inertia plate 172, a function spring 173 and ratchet 175. The ratchet 175 includes teeth 179 on its outer surface and is secured to the shaft 110 by and end retainer button 180. The inertia plate includes a central opening 173 permitting the plate 172 to freely rotate relative to the right hand end of the shaft 110. The clutch 170 includes a cavity 171 formed in the upper part of the support plate having an inner wall 174 with teeth 176 for engagement with the locking pawl 163 of the web sensor. The pawl plate 161 referred to above fits into the cavity 171 of the support plate 152. The inertia plate 172 fits inside a cavity formed by the ratchet wheel 175. The inertia plate 172 functions such that when the webbing is protracted quickly is lags behind the motion of the shaft 110 and pawl plate 161. Inertia plates such as that illustrated typically includes a cam or finger which operate upon the locking web sensing pawl moving same into engagement with the teeth 174.

The support member 152 is biased to a zero position relative to frame side 36 by a spring 186 which is diagrammatically shown. In normal operation, this spring 186 moves the locking mechanism's pin 139 outwardly in the slot 178, of the vehicle sensor support to prevent premature lockup. During a crash or other time when the webbing is protracted at a high rate the locking pawl of the web sensor moves into engagement with the support member 152 coupling the support member 152 with the pawl plate and with the shaft 110 which drives the pawl plate. As mentioned above the support member 152, in this embodiment, is free to rotate relative to the shaft. When the locking pawl is engaged with the teeth 174 the support member 152 will rotate with the spool. As the member 152 rotates it moves the locking mechanism pin 139 which in turn moves the locking mechanism into engagement with the teeth 98*a,b* on the disks 92*a, b* to halt the rotation of the spool 50.

A purpose and advantage of the present vehicle sensor unit 300 is to provide a single set of components which will permit the vehicle sensor to be used in a retractor in which the frame is mounted at an angular or skewed orientation relative to vertical. As is known in the art vehicle sensors include an inertial mass which must be maintained in a known orientation relative to vertical. If the frame is tilted the vehicle sensor will typically not work. In the present invention the vehicle sensor is made to accommodate different mounting angles of the frame which may be necessary to fit the retractor within a desired package envelope within the vehicle. Reference is briefly made to FIG. 1 which shows two such mounting angles of the retractor frame, angle A which is illustrative of a side to side mounting angle and angle B which is illustrative of a front to rear mounting angle. As will be seen from the description below the invention includes means for mounting a sensor portion of the vehicle sensor at two different angles and means to lock various parts of the sensor at these angles. The vehicle sensor unit 300 includes part of the support 152 which as mentioned earlier could be the retractor frame or a part fixedly attached thereto. Reference is made to FIG. 2–5 which illustrates various views of the plate or vehicle sensor support 152. More specifically FIGS. 2–4 illustrates various plan views of the support while FIG. 5 illustrates a projected assembled view. In general, the support 152 includes an upper portion 200 having the plurality of inner teeth 174 which are engaged by the web sensor pawl 163. The support includes a central portion 204 having an extending pin 206 which is adapted to support a rotating lever or pawl 208 (shown in FIG. 1) which when activated engages the teeth 179 on the ratchet wheel 176. Also located on the middle portion 204 are two extending pins 209*a* and 209*b* which function as a wire guide for a lifting member 450 which links an activation portion 420 of the vehicle sensor and the pawl 208. The support 152, at its lower portion 210, functions as a vehicle sensor housing. This vehicle sensing housing portion includes an extending tab 212 and three outwardly and radially extending tabs 214*a*–214*c* each of which includes a leg portion 216 and an inwardly extending cap portion 218 (see FIG. 5).

As shown in FIGS. 1 and 6 through 8, the vehicle sensor unit 300 includes a lower or outer vehicle sensor support member or part 310 and vehicle sensor portion 320. The sensor portion 320 includes a lower basket 322, a sensing mass formed as a standing man 324, or alternatively a rolling sphere, and the activation portion 420. The standing man 324 includes a central plastic support part 328 and a metal mass 330 attached thereto.

Figure 6:
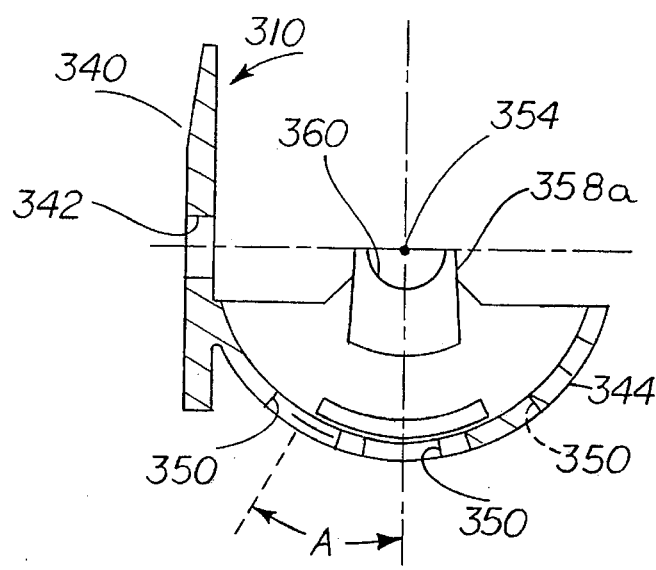
Figure 7:
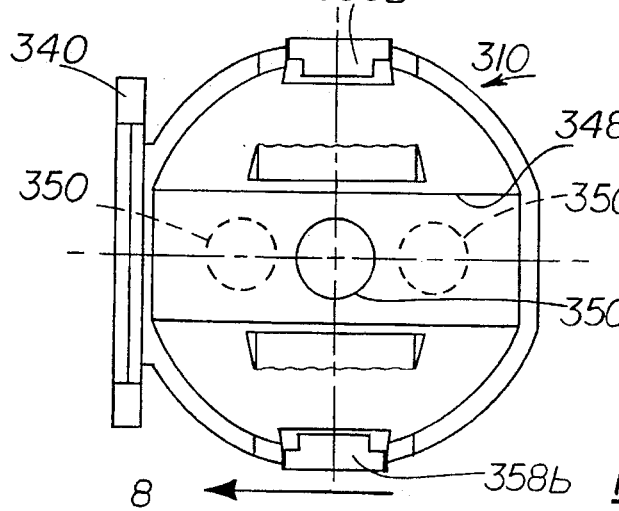

With regard to the lower member or part 310, this member includes a vertical bracket or flange 340 having a central hole 342. Depending from the bracket or flange 340 is a basket 344 into which the basket 322 of the sensor portion 320 is inserted and rotationally fixed at a predetermined angle which corresponds to the negative of the front to rear mounting angle B of the retractor frame. The basket 344 includes a generally spherically shaped inner surface 346 having a circular, central groove 348 of radius r1 therein. Positioned within the groove 348 is a locating member such as an opening 350. As will be seen from the description below, the locating member is used to define the required angular orientation of the sensor portion 320 and its location will depend upon the magnitude of the side to side angle A of the retractor frame. As shown in FIG. 7 this locating member or opening 350 is located at the center of the groove 348 if the angle A is zero degrees. However, the location of this opening will depend and vary with the mounting angle of the frame and as mentioned is chosen such that the standing man 324 is maintained, in a static, vertically standing position. Depending upon the angle of the frame, the hole 350 maybe located a fixed number of degrees to the right or to the left of the hole 350 as shown in FIG. 7. Extending upwardly from the basket 344 are a plurality of bosses 352*a* and 352*b*. As can be seen, each of the bosses includes an inwardly extending leg 358*a* and 358*b*. Each of these leg 358*a* and 358*b* includes a circular guide surface 360 as shown in FIG. 6, which is also used to lock the sensor portion 320 in place. Superimposed on the lower member 310 are two, co-planar, perpendicular coordinate reference axes 354 and 356 the purpose of which will be seen from the description below. Reference axis 356 shares a common original with axis 354 and extends through the center of the opening 342. Reference axis 354 extends through the center of the each circular guide surface 360. The axis 354 is used to orient the sensor portion 320 relative to the lower member 310 and the axis 356 is used to orient the lower member relative to the support 152.

Figure 8:
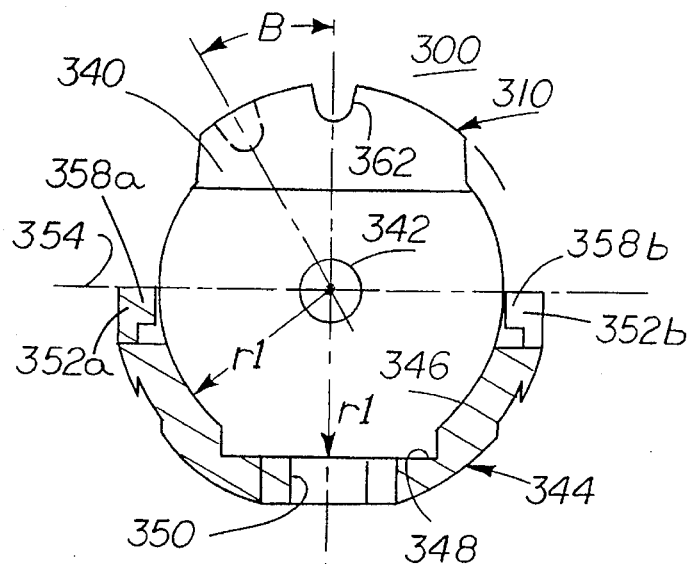
FIGS. 6–8 show various views of a lower housing member of a vehicle sensor.

Once the front to rear mounting angle B of the retractor is known it will be necessary to fix the lower member in place. The means of fixing the lower member to the support 152 includes a notch 362 formed in the flange 340. The positioning of the notch 362 will be the negative of the mounting angle B. If the mounting angle B is zero degrees, as shown in FIG. 8, the notch 362 is in the vertical or zero position. The lower member 310 is secured to the support 152 as follows. The shaped flange 340 is slid under the various tabs or bosses 214. The notch 362 is slid underneath the tab or boss 214*a* and captured by an integrally formed pin 215. Ill or example the retractor frame is mounted in the vehicle at an angle B of−15 degrees from the vertical, the notch 362 of the flange 340 is similarly relocated to a +15 degree orientation, about axis 356, and shown in phantom line. With the lower member 310 mounted as described above the groove 348 is maintained in a vertical position.

The angular orientation of the vehicle sensor portion 320 relative to the lower member 310 will depend upon the frame side to side mounting angle A. Once this angle is known the location of the locating member or opening 350 can then be fixed in the lower member 310. As will be seen from the description below the sensor portion 320 includes a projection which fixes the sensor portion 320 at the negative of this angle to the lower member 310. The vehicle sensor portion 320, mentioned above is also in FIGS. 9–12, and includes a basket 322. Extending from the basket are a plurality of legs 370*a* and 370*b*. Each of which has a center opening 372 for receipt of a hinge pin 374. In an alternate embodiment the pin can be replaced with bosses formed on the legs which extend directly into openings on a mating hinge portion. The bottom 376 of the basket is generally spherical shaped at 378 having a radius of r1, which is essentially the radius of the inner surfaces of the lower member 310. A portion of the bottom at 380 forms a first projection 382. As can be seen from the plan view of the basket 322, shown in FIG. 9, this projection has a circular shaped with radius r1. Depending from the center of the projection 382 is another locating member or boss 384. The boss is designed to fit within the opening 350 of the lower member 310. If the frame mounting angle A is zero degrees then the opening 350 located in the bottom center of the lower member 310 as shown. The projection 382, in this embodiment is always at the bottom center of the projection 382 of the basket 322. When the basket 322 of the sensor portion 320 is mated to the lower member 310, with the locating members as described, the basket 322 is at a zero angular orientation relative to the basket 344 of the lower member 310. This orientation is shown in FIG. 5 which is a projected view of the support 152, lower member 310 and sensor portion 320. FIG. 19 shows the sensor 320 at an angle of 15 degrees relative to the lower member 310 and also shows the lower member 310 at an angle of 20 degrees relative to the support 152.

The wall of the basket 322 at 400 and 402 include oppositely positioned circularly shaped grooves 404a and 404b. An axis 354a extends through the center of the circle forming the grooves and lies on a major diameter or equatorial plane of a sphere superimposed about the basket 322. The axis 356 in the lower member 310 extends through the geometric center of the sphere. When the basket 322 is fitted to the lower member 310 the projection 382 fits into the groove 348 and the member or projection or boss 382 fits within the opening 350. Further with the basket fitted to the lower member 310, the side walls of the basket in particular the circular grooves 404a and 404b fit under a respective one of the circular surfaces 360 of the bosses 358a and 358b and locked. The center of the circular grooves, through which axis 354a extends, is concentric with the axis 354 to insure the grooves and corresponding surface to slide relative to one another and to properly orient the sensor portion 320 to the lower member 310.

Figure 13:
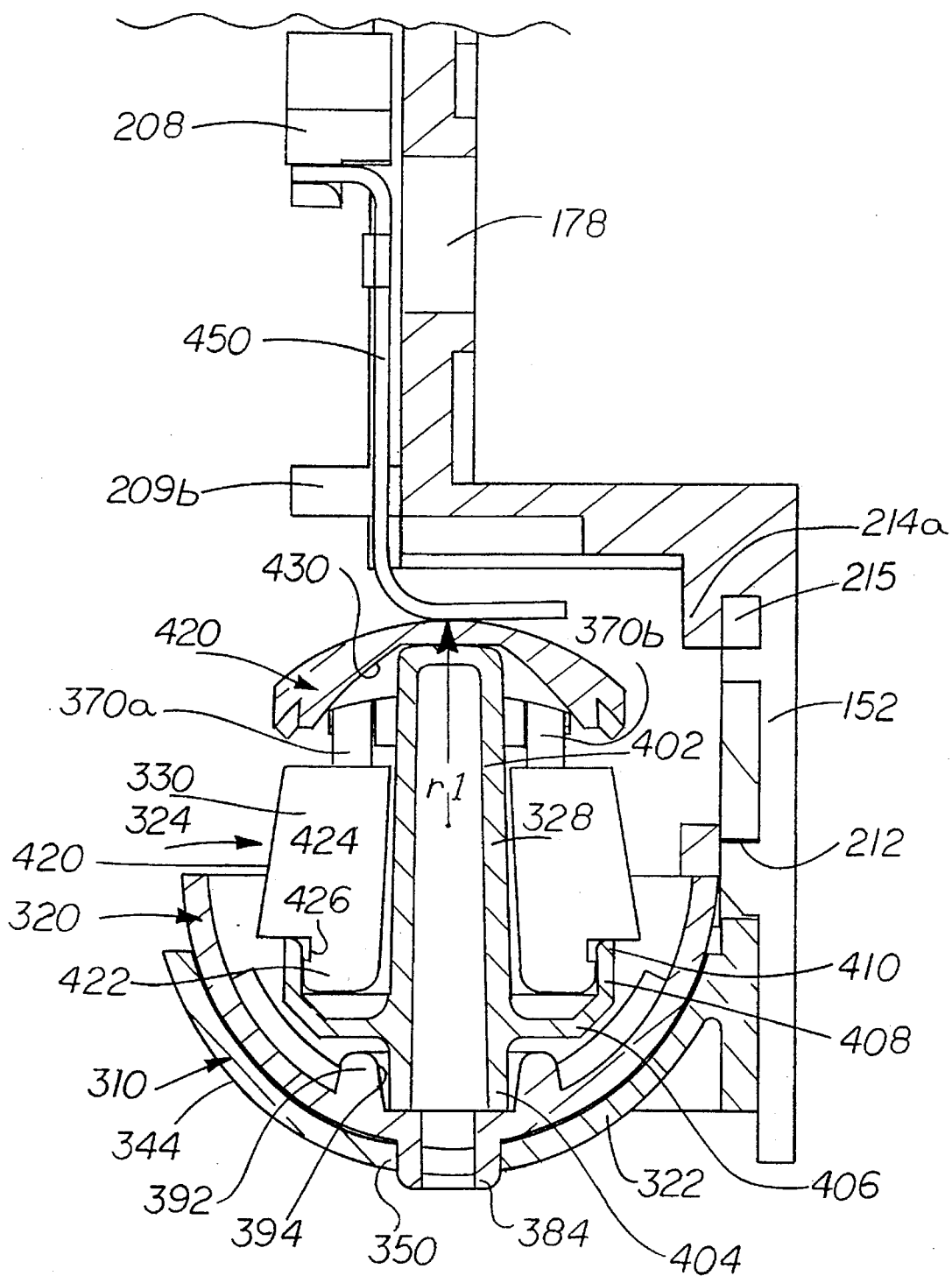
FIG. 13 is a cross sectional view showing the interrelationship of many of the vehicle sensor components.

Rotationally fitted to the extending legs 370a and 370b is a hinged activation member generally shown as 420 which is also shown in FIGS. 12 and 13. The hinge activation member 420 includes a top member 422 having a spherical shape surface 424 and an activation arm 426 having openings 428 through which the pin 374 is received. FIG. 13 illustrates a cross-sectional view through the activation portion 420. As can be seen, the inner surface of the activation portion includes a generally spherical shaped contour or groove 430 into which is received the top of a locating pin 432 of the standing man 324. In a static condition the standing man 424 maintains the height of the spherically shaped activation surface at a constant height equal to the radius r1 of the basket 322. In this way if the basket is rotated, either about axis 354 or 356 in the lower or outer member 310 the distance between the activation member 420 and the lever or lift pin 450 remains constant.

Reference is made to FIG. 14 which showsin greater detail the features of the standing man 324. The standing man includes a central, plastic support member 328 having a central, tapered pin 402 which terminates in a boss 404 that is received within a circular cavity 394 of the basket 322. As can be seen from FIG. 13, the inner bottom surface 390 of the basket includes an upraised annular boss 392 forming a cavity 394. Extending radially outward from the pin is a plate member 406 having upraised walls 408. The inner surface of these walls include peripheral boss 410. The mass portion 330 of the standing man includes a conical shaped mass 420 having a circular boss 422 extending therefrom. The circular boss in combination with an upper part 424 of the mass defines a small groove 426 in to which the boss 410 extends when the mass is fitted into the plate 406. When a hign deceleratio is sensed the inertial member 324 pivots over the projection 392 and raises the activation portion 420.

In a static situation, that is when the standing man extends vertically upward to position the top surface 424 of the activation portion 420 along the radius r1 defining the spherical surface 378 of the basket. Loosely seated upon the activation surface 424 is the lever or lilt pin 450 which is received within an opening of the pawl 208 (as shown in FIGS. 1, 5, 13 and 14) and which is also positioned between the wire guides 209a and 209b. Any movement of the standing man off of its vertical orientation causes the activation portion 420 to be moved upwardly thereby urging the lever 450 to move the pawl 208 into engagement with the ratchet 175 of the such mechanism Once the ratchet 176 is locked a relative rotation is created as the web sensing mass continues to move with the rotating shalt 110. This rotation causes the web sensing pawl 163 to move outwardly to engage the teeth 174 of the support member 152 causing, as with the operation of the web sensor, the support to rotate and move the locking member 140 into locking engagement with the teeth 98 on the spool 50. It should be appreciated that the pawl 208 can be used to directly act on and lock the teeth of the spool 50. As can be appreciated from the above the angular orientation of the support 152 and outer member can be simply varied by changing the position of the slot 362, and the orientation between the outer 310 and inner members 320 can be changed by varying the location of the hole 350 and the projection 382. Further, these members can be eliminated if flange 340 and the sherically shaped parts 310 and 320 can be held at the desired angular orientation and welded or otherwise joined together.

Many changes and modifications in the above described embodiment of the invention can, of course, be carried out without departing from the scope thereof. Accordingly, that scope is intended to be limited only by the scope of the appended claims.

We claim:

1. A vehicle inertia or deceleration sensing device (300) of a seat belt retractor (30) comprising:

an outer housing member (310) including a first housing part (344) for supporting an inner housing member (320) at a predetermined relative angle, the first housing part including first and second coordinate reference axes (354, 356) superimposed therein, the inner housing member (320) comprising:
a second housing part (322) supported by the first housing part, including:
an outer surface (376), a portion (382) of which has a diameter of r1 measured from a geometric center of the second housing part and an inner surface,
at least one extending leg member (370a, b) having an end which defines a hinge axis (372, 374),
an activation portion (420) pivotally connected at the hinge axis and including a spherically shaped, top surface ((424) having by a radius of r1 and an under surface (430), and
an inertial member (324), responsive to changes in vehicle acceleration or deceleration and movable relative to the inner surface (390) of the second housing part (322), the inertial member also supporting the under surface (430) of the activation portion, such that in a rest position, the spherical top surface of the activation portion is positioned such that it lies on a sphere of radius r1, centered at the center of the second housing part;

first means (384, 350) for fixedly mounting the second housing part at a predetermined first angle about the first reference axis in the first housing part, such angular positioning not changing a height dimension of the activation surface, a support member (152) for supporting the first housing part, second means (214, 206) for fixedly mounting the first housing part at a predetermined second angle, about the second reference axis relative to the support member, without changing the height of the activation portion, wherein in response to an acceleration or deceleration greater than a given magnitude the inertial mass moves relative to the inner surface, and moves the activation portion outwardly.

2. The device as defined in claim 1 including an lift member (450) supported by the support member, the lift member including a first end slidingly engaging the activation surface and a second end operatively coupled to a sensor pawl, rotationally supported on the support member, wherein the movement of the activation surface causes movement of the member which in turn causes movement of the pawl.

3. The device as defined in claim 1 wherein the outer housing member includes a flange portion (340) extending from the first housing part and wherein the second means includes one of a mounting pin and a mounting hole on one of the flange and the support member to permit relative rotation about the second axis to the second angle, the second means further including, on the support member capture means for holding the flange thereto at the second angle.

4. The device as defined in claim 3 wherein the capture means includes a plurality of inwardly directed flanges or bosses which hold the flange portion of the out housing member thereto and a locating member for fixing the angular orientation of the flange portion to the support member.

5. The device as defined in claim 1 wherein the first means includes one of a projection and a receiving device and one of the first housing part and second housing part.

6. The device as defined in claim 5 wherein the projection is on the outer surface of the first housing part and the receiving device includes an upraised annular groove on a predetermined part of the inner surface of the second housing part to effect an angular rotation of the first and second housing parts.

7. The device as defined in claim 6 wherein the first means further includes:

a plurality of bosses oppositely extending on the first housing part and located along the second axis, each boss including a first circularly shaped guide surface, a plurality of opposingly situated second circularly shaped guide surfaces engagable with the first circularly shaped guide surfaces.

8. The device as defined in claim 1 wherein one of the first and second angles correspond to a mounting angle of a retractor.

9. A seat belt retractor comprising:

a vehicle inertia or decelaration sensing device (300) for initiating lock up of a spool of the retractor (30) comprising:

an outer housing member (310) including a first housing part (344) for supporting an inner housing member (320) at a predetermined relative angle, the inner housing member (320) comprising:

a second housing part (322) supported by the first housing part, including:

an outer surface (376), a member (370a,b) defining a hinge axis (372, 374), an activation portion (420) pivotally connected at the hinge axis and including a spherically shaped, top surface (424) and an under surface (430), and an intertail member (324), responsive to changes in vechicle acceleration or deceleration and moveable relative to the inner surface (390) of the second housing part (322), the inertial member also supporting the under surface (430) of the activation portion, such that in a rest position, the sperical top surface of the activation portion is positioned such that it lies a predetermined distance from the center of the sphere, centered at the center of the second housing part;

first means (384, 350) for fixedly mounting the second housing part at a predetermined first angle about a first reference axis in the first housing part, such angular positioning not changing a height dimension of the activation surface, a support member (152) for supporting the first housing part, second means (214, 206) for fixedly mounting the first housing part at a predertermined second angle, about a second reference axis relative to the support member, without changing the heigth of the activation portion, wherein in response to an acceleration or deceleration greater than a given magnitude the inertial mass moves relative to the inner surface, and moves the activation portion outwardly.

10. The device as difined in claim 9 wherein the first housing part includes the first and second coordinate reference axes (354, 356) superimposed therein, and the outer surface includes a portion (382) of which has a diameter of r1 measured from a geometric center of the second housing part and an inner surface, the spherically shaped top surface of the activation portion having a radius of r1, and wherein the spherical top surface of the acrivation portion is positioned such that it lies on a sphere of radius r1.

11. The device as defined in claim 9 including a lift member (450) supported by the support member, the lift member including a first end slidingly engaging the activation surface and a second end operatively cupled to a sensor pawl, rotationally supported on the support member, wherein the movement of the activation surface causes movement of the member which in turn causes movement of the pawl.

12. The device as difined in claim 9 wherein the outer housing member includes a flange portion (340) extending from the first housing part and wherein the second means includes one of a mounting pin a mounting hole on one of the flanges and the support member to permit relative rotation about the second axis to the second angle, the second means further including, on the support member, capture means for holding the flange thereto at the second angle.

13. The device as difined in claim 9 wherein the first means includes one of a projection and a second housing part.

14. The device as difined claim 9 wherein one of the first and second angles corresponds to a mounting angle the retractor.

15. The device as difined claim 9 wherein the retractor (30) comprises: a frame (32) having a base and two parallel side walls (34,36) extending therefrom, each side wall includes an outer portion having a shaft receiving opening and an inner portion and a shoulder therebetween, a first opening or pocket (40,42) formed in at least the inner portion of each side wall rotationally supporting a locking mechanism (130), the locking mechanism movable between a deactivated position and an activated position and when activated stops the rotation of a spool;

the spool (50, 54), rotatably positioned relative to the side walls, first and second disks (92*a,b*) engagable with the locking mechanism and rotatable with the spool.

16. The device as difined claim 15 wherein the spool includes a plurality of bars or pins, the first and second disks positoned on opposite sides of the spool, the pins received within cooperating bores in the spool and joining the disks together, and wherein a shaft rotationally links the disks for providing an axis of rotation of the spool and disks, wherein the shaft is received and rotationally supported in the shaft receiving opening.

17. The device as difined in claim 15 wherein at least one of the pin receiving through bores is offset relative to a corresponding pin such that it only partially envelops the pin and wherein the webbing is fit between the shaft and such pin.

18. The device as difined in claim 15 wherein the pockets (40, 42) are formed in the inner portions and in the shoulders.

19. The device as difined in claim 15 wherein the locking mechanism includes two oppositely positoned pawls (132) rotationally mounted within a corresponding one of the pockets (40) and a bar (134) joining each pawl, the locking mechanism movable between a deactivated position and an activated position.

20. The device as defined in claim 18 wherein the side wall outer portions are adjacent a corresponding one of the pawls to retain the locking mechanism laterally within the frame.

* * * * *